United States Patent
Hauff et al.

(10) Patent No.: US 12,416,647 B2
(45) Date of Patent: Sep. 16, 2025

(54) SENSOR, AND SYSTEM COMPRISING THE SENSOR AND COMPRISING A FASTENING APPARATUS

(71) Applicant: Knorr-Bremse Systeme Fuer Nutzfahrzeuge GmbH, Munich (DE)

(72) Inventors: Michael Hauff, Munich (DE); Tobias Rohse, Schwieberdingen (DE); Karl-Heinz Schmid, Besigheim (DE); Gerhard Wieder, Besigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 651 days.

(21) Appl. No.: 17/760,594

(22) PCT Filed: Sep. 3, 2020

(86) PCT No.: PCT/EP2020/074537
§ 371 (c)(1),
(2) Date: Mar. 15, 2022

(87) PCT Pub. No.: WO2021/052762
PCT Pub. Date: Mar. 25, 2021

(65) Prior Publication Data
US 2022/0404385 A1    Dec. 22, 2022

(30) Foreign Application Priority Data
Sep. 20, 2019  (DE) .................. 10 2019 125 405.1

(51) Int. Cl.
G01P 3/487        (2006.01)
G01P 1/02         (2006.01)

(52) U.S. Cl.
CPC .............. *G01P 3/487* (2013.01); *G01P 1/026* (2013.01)

(58) Field of Classification Search
CPC .................. G01P 3/487; G01P 1/026
USPC ............................................. 73/494
See application file for complete search history.

(56) References Cited

U.S. PATENT DOCUMENTS

| 5,975,761 A | 11/1999 | Ouchi et al. |
| 6,254,276 B1 * | 7/2001 | Ouchi ................. F16C 33/723 324/207.25 |
| 2003/0033897 A1 | 2/2003 | Easton |
| 2008/0205806 A1 | 8/2008 | Clark |

(Continued)

FOREIGN PATENT DOCUMENTS

| CN | 104049024 A | 9/2014 |
| CN | 104903730 A | 9/2015 |
| CN | 106104215 A | 11/2016 |

(Continued)

OTHER PUBLICATIONS

International Search Report dated Dec. 4, 2020 in connection with PCT/EP2020/074537.

*Primary Examiner* — Nathaniel T Woodward
(74) *Attorney, Agent, or Firm* — NORTON ROSE FULBRIGHT US LLP

(57) ABSTRACT

A sensor for detecting a physical variable in dependence on an alignment of the sensor around an axis of the sensor, including: a sensor body having a predetermined first shape feature on an outer surface of the sensor body for enabling a predetermined alignment of the sensor around the axis. Also described is a related system with the sensor.

9 Claims, 4 Drawing Sheets

(56) References Cited

U.S. PATENT DOCUMENTS

2013/0272637 A1  10/2013  Schaefer et al.
2016/0146847 A1*  5/2016  Kuster .................... G01P 3/488
                                                           324/207.25

FOREIGN PATENT DOCUMENTS

| DE | 8815130 U1 | 2/1989 |
| DE | 69815739 T2 | 4/2004 |
| DE | 102010049552 A1 | 4/2012 |
| DE | 102013213243 A1 | 9/2014 |
| DE | 102013010925 A1 | 1/2015 |
| DE | 102017113604 A1 | 12/2018 |
| EP | 1284424 A2 | 2/2003 |
| FR | 2627620 A3 | 8/1989 |
| WO | 2018234418 A1 | 12/2018 |

\* cited by examiner

SENSOR, AND SYSTEM COMPRISING THE SENSOR AND COMPRISING A FASTENING APPARATUS

FIELD OF THE INVENTION

The invention relates to a sensor and a system comprising the sensor and a fastening apparatus, in particular, it relates to a sensor for detecting a physical variable in dependence on an alignment of the sensor and a system comprising the sensor and a fastening apparatus.

BACKGROUND INFORMATION

Until now, passive sensors have primarily been used, in particular in the field of speed detection in vehicles, to enable a function of assistance systems, for example ABS, ASR, or ESP.

More recently, active sensors have increasingly been used, thus sensors which are activated by application of a supply voltage and generate an output signal. Therefore, for example, a data log is already generated in the sensor, which, after being transferred via a bus system, can be evaluated in a control unit. In addition, there is the option of implementing diagnostic functions.

In particular in the field of wheel speed detection, sensors having at least two measuring elements are used to detect a movement direction of the wheel. It is therefore necessary upon the use of the sensors to install the wheel speed sensors in a predetermined orientation in the vehicle, so that the measuring elements of the sensors are aligned in relation to a movement of pole wheels. This alignment also cannot change during operation.

SUMMARY OF THE INVENTION

The invention is based on an object of solving the above problems and providing a sensor and a system comprising a sensor and a fastening apparatus, using which the sensor can be aligned easily and permanently.

The object may be achieved by a sensor as described herein and a system as described herein. Advantageous refinements are contained in the further descriptions herein.

According to one aspect of the invention, a sensor body of a sensor for detecting a physical variable in dependence on an alignment of the sensor around an axis has a predetermined first shape feature on an outer surface, which is configured to enable a predetermined alignment of the sensor around the axis.

The possibility is fundamentally provided by this shape feature of establishing a formfitting connection to a fastening apparatus, so that a predetermined alignment of the sensor is possible easily and permanently.

In one advantageous refinement of the sensor, the physical variable is a magnetic pulse induced by a movement of an object in the vicinity of the sensor, and the sensor is configured as an active speed sensor which magnetically detects a direction of the movement of the object.

An application of such active sensors in the field of speed detection of wheels of vehicles enables a signal transfer to be simplified and, for example, diagnostic functions to be implemented. Furthermore, a slow movement from a standstill can be detected at all or more accurately by providing the active speed sensor. The direction of the movement may be detected by providing multiple measuring elements for the magnetic pulse in the sensor. Therefore, both a movement and also a direction of the movement, for example, of a pole wheel as the object can be detected by the sensor.

In a further advantageous refinement of the sensor, the first shape feature has a depression on the outer surface of the sensor body.

A depression in the sensor body is easy to produce and easily offers the option of enabling the alignment of the sensor upon a provision of a counterpart complementary to the depression, namely an elevation on the fastening apparatus.

In another advantageous refinement of the sensor, the first shape feature has an elevation on the outer surface of the sensor body.

An elevation of the sensor body, optionally combined with a depression, is also easy to produce and easily offers the option of enabling the alignment of the sensor upon a provision of a counterpart complementary to the elevation and possibly to the depression.

According to a further advantageous refinement of the sensor, the sensor body has an essentially circular cylindrical shape, the alignment of the sensor is a predetermined orientation around the longitudinal axis of the essentially circular cylindrical shape, and the elevation is arranged at a predetermined point on the circumference of the sensor housing.

Due to this structural form of the sensor, which corresponds in principle to previous structural forms, the sensor can be installed without extensive reconfigurations at the previous installation location.

In a further advantageous refinement of the sensor, the elevation has a distance in the axial direction from an adjoining end of the sensor body.

Installation of the sensor is simplified by this feature, since the sensor can first simply be plugged into an opening of a fastening device, without paying attention to the orientation of the sensor. The sensor can then be pivoted with a slight rotational force to achieve the predetermined orientation and enable a form fit with the elevation.

In one advantageous refinement of the sensor, the elevation forms a rib extending in parallel to the longitudinal axis.

A provision of the rib in parallel to the longitudinal axis is easily implementable in manufacturing and the orientation of the sensor can be permanently maintained securely.

According to a further aspect of the invention, a system comprising the sensor and a fastening apparatus for the sensor is provided, wherein the fastening apparatus has a receptacle body having a receptacle apparatus, which is configured to accommodate the sensor body, and a second shape feature complementary to the first shape feature on the receptacle body.

The option is provided by this system of establishing the formfitting connection between the sensor and the fastening apparatus, so that a specific alignment of the sensor is possible easily and permanently.

In one advantageous refinement of the system, the receptacle apparatus has an elongated opening having an essentially circular cross section, and the second shape feature has a groove along a longitudinal direction of the opening.

In such a receptacle apparatus, it is possible to align the sensor having the sensor body, which has an essentially circular cylindrical shape, and the elevation, which is arranged at a predetermined point on the circumference of the sensor housing, easily and securely.

Furthermore, in a further advantageous refinement of the system, a fastening structure or apparatus having a third shape feature complementary to the first shape feature and the second shape feature is additionally provided.

By providing such a fastening structure or apparatus, the sensor can be securely fastened while maintaining the orientation.

In a further advantageous refinement of the system, the fastening structure or apparatus has a clamping sleeve which is configured to be accommodated in the opening and to be clamped therein radially between the opening and the sensor body, wherein the clamping sleeve is provided on its circumference with the third shape feature.

By providing this clamping sleeve, the sensor can be fastened securely in the predetermined orientation at the same time upon insertion into the opening, so that the installation process is simplified, and it is nonetheless possible to still displace the sensor axially as needed.

In a further advantageous refinement of the system, the third shape feature is configured as an axial slot on the circumference of the clamping sleeve, wherein the slot longitudinal sides form two spaced-apart end sections on the circumference of the clamping sleeve.

Such a clamping sleeve is insensitive in relation to tolerances of the opening and the sensor and can be produced easily.

In one advantageous refinement of the system, the two end sections are bent radially outward, the groove and the clamping sleeve are configured so that the two end sections protrude into the groove and the elevation of the sensor is arranged between the two end sections protruding radially outward into the groove.

This arrangement facilitates the installation, since the clamping sleeve can already be installed beforehand having the correct orientation of the third shape feature.

In one advantageous refinement of the system, the third shape feature additionally has an elevation protruding radially outward into the groove of the opening.

Such a configuration of the clamping sleeve simplifies its production.

The invention is explained hereinafter on the basis of exemplary embodiments with reference to the appended drawings.

DETAILED DESCRIPTION

Figure 1:
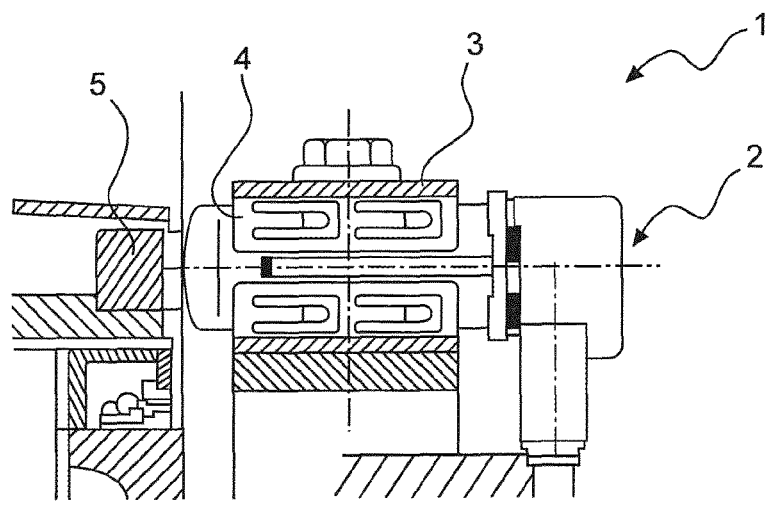
FIG. 1 shows a lateral sectional view of an installation situation of a system according to the invention comprising a sensor, a fastening apparatus, and a fastening structure or apparatus.

FIG. 1 shows a lateral sectional view of an installation situation of a system 1 according to the invention, which comprises a sensor 2, a fastening apparatus 3, and a fastening structure or apparatus 4. In an alternative embodiment, the fastening structure or apparatus 4 is not provided, rather the fastening apparatus is configured so that no separate fastening mechanism is required.

Furthermore, FIG. 1 shows a pole wheel 5, which initiates magnetic pulses upon a rotation, which are detected by the sensor 2.

Figure 2:
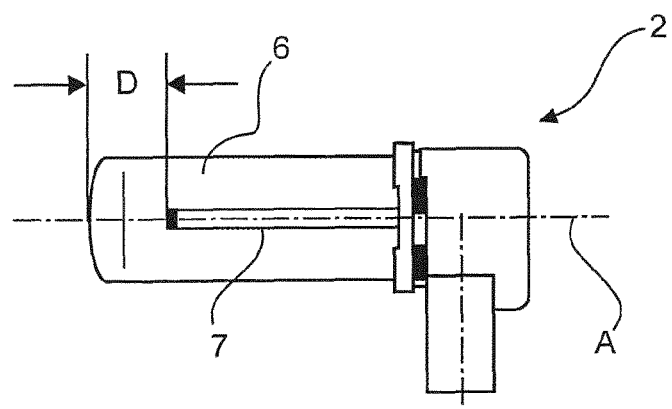
FIG. 2 shows a side view of the sensor having a first shape feature.

FIG. 2 shows a side view of the sensor 2 having a first shape feature 7. The sensor has an axis A, wherein the sensor 2 is a sensor for detecting a physical variable in dependence on an alignment of the sensor 2 around the axis A. In particular, the sensor 2 detects a change of a physical variable as a result of a movement of a material with respect to the sensor 2, wherein the movement is only detectable in a predetermined alignment of the sensor 2 around the axis A. The material is in this embodiment the pole wheel 5 having its teeth and the sensor 2 detects the magnetic pulses of the pole wheel 5 only when its alignment around the axis A is selected so that a detection direction corresponds to a tangential direction of the pole wheel 5.

The sensor 2 is configured as an active speed sensor, thus as a sensor which is activated by applying a supply voltage and generates an output signal.

The sensor 2 has a sensor body 6. A rib, thus an elevation, is provided as the first shape feature 7 on an outer surface of the sensor body 6. The elevation is provided at a predetermined point on the circumference of the sensor housing 6 and the first shape feature 7 thus enables a predetermined alignment of the sensor 2 around its axis A.

In an alternative embodiment, not a rib as an elevation, but rather, for example, a conical elevation is provided as the first shape feature 7. Alternatively, it is also possible that the first shape feature 7 is a depression, thus, for example, a bead along the axis A or a tangential flattening.

The sensor body 6 has an essentially circular cylindrical shape. Having the essentially circular cylindrical shape means that, in contrast to the completely circular cylindrical shape, the first shape feature is provided and/or other functional surfaces, for example, flats, are provided. The axis A is in this embodiment a longitudinal axis of the essentially circular cylindrical shape of the sensor body 6. The rib is arranged in parallel to the longitudinal axis.

As is also shown in FIG. 2, the elevation has a distance D in the axial direction from an adjoining end of the sensor body 6. The distance D is 8 mm in this embodiment, but can alternatively be greater or less.

Figure 3:
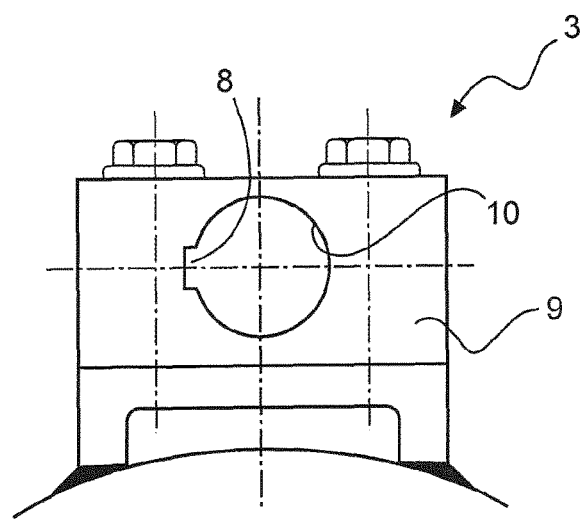
FIG. 3 shows a front view of the fastening apparatus having a second shape feature.

FIG. 3 shows a front view of the fastening apparatus 3 having a second shape feature 8. The fastening apparatus 3 has a receptacle body 9 having a receptacle apparatus 10, which is configured to accommodate the sensor body 6. The receptacle apparatus 10 is embodied in this embodiment as a hole, namely as an elongated opening having an essentially circular cross section, in the receptacle body 9, but can alternatively, for example, also be a thread for screwing on a correspondingly configured sensor 2.

The fastening apparatus 3 furthermore has a groove on the receptacle body 9 as the second shape feature 8 along a longitudinal direction in the hole. The second shape feature 8 is complementary to the first shape feature 7, which means that the properties of the first shape feature 7 and the second shape feature 8 complement one another and the first shape feature 7 and the second shape feature 8 fit with one another.

Figure 4:
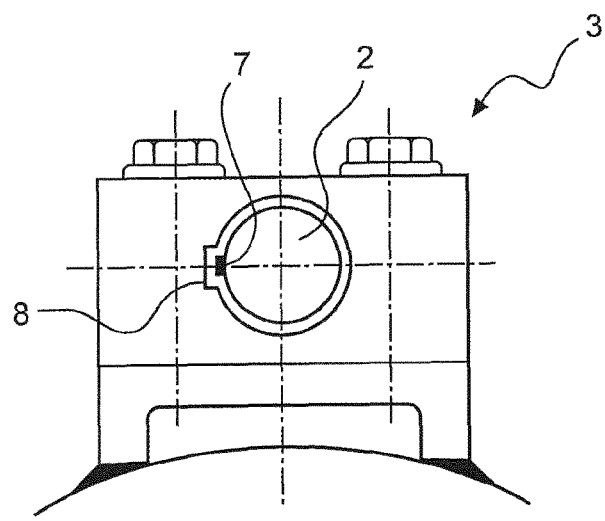
FIG. 4 shows a front view of the fastening apparatus of FIG. 3 with the installed sensor.

FIG. 4 shows a front view of the fastening apparatus 3 having the installed sensor 2 and the complementary shape features 7, 8.

Figure 5:
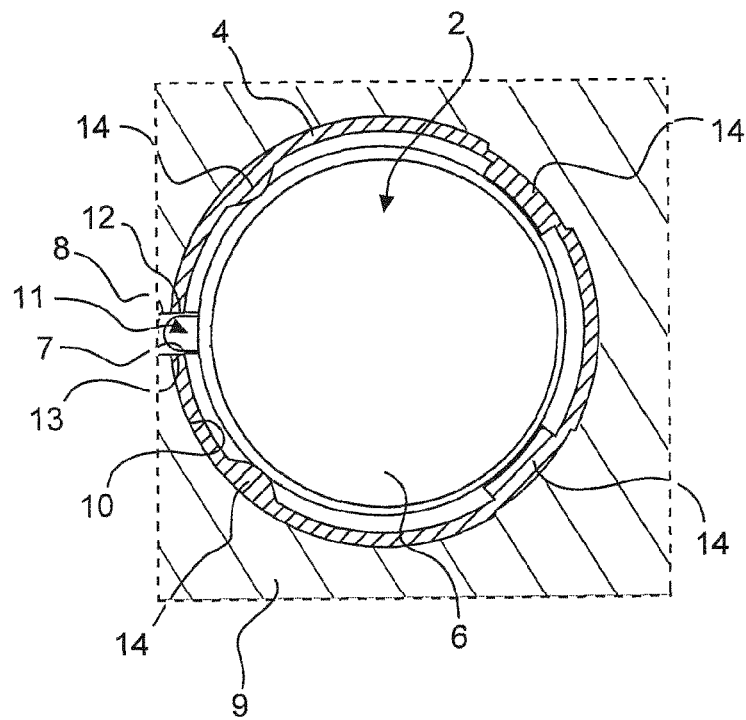
FIG. 5 shows a detail of the illustration of FIG. 4 with the installed sensor and additionally a fastening structure or apparatus in a first embodiment.

FIG. 5 shows a detail of the illustration of FIG. 4 having the installed sensor 2 and in addition a fastening structure or apparatus 4 in a first embodiment. The fastening structure or apparatus 4 has a third shape feature 11, which is complementary to the first shape feature 7 and the second shape feature 8 or is shaped so that their shape properties complement one another.

In this embodiment, the fastening structure or apparatus 4 has a clamping sleeve. The clamping sleeve is configured to be accommodated in the opening, thus in the receptacle apparatus 10, and to be clamped therein radially between the opening and the sensor body 6.

The clamping sleeve is provided on its circumference with the third shape feature 11. In this embodiment, the third shape feature 11 has an axial gap between two end sections 12, 13 on the circumference of the clamping sleeve. This means that a continuous slot in the axial direction is provided on its circumference in the clamping sleeve. The rib of the sensor body 6 protrudes through the slot, namely the third shape feature 11, into the groove, namely the second shape feature 8, to implement the alignment of the sensor 2 and the clamping sleeve around the axis A.

The clamping sleeve is furthermore provided with spring elements 14 to apply a secure clamping force. The spring elements 14 are essentially elongated rectangular tongues, which are formed integrally on the clamping sleeve in the longitudinal direction at one end or fastened thereon. Alternatively, another shape, for example a square shape is also possible. They are typically formed by stamping free the contour of the tongues on three sides and then bent outward, so that they are pre-tensioned and protrude outward. The spring elements 14 thus apply a radial clamping force upon an insertion into the opening of the receptacle body 9 due to a resilient property of the material of the clamping sleeve.

Figure 6:
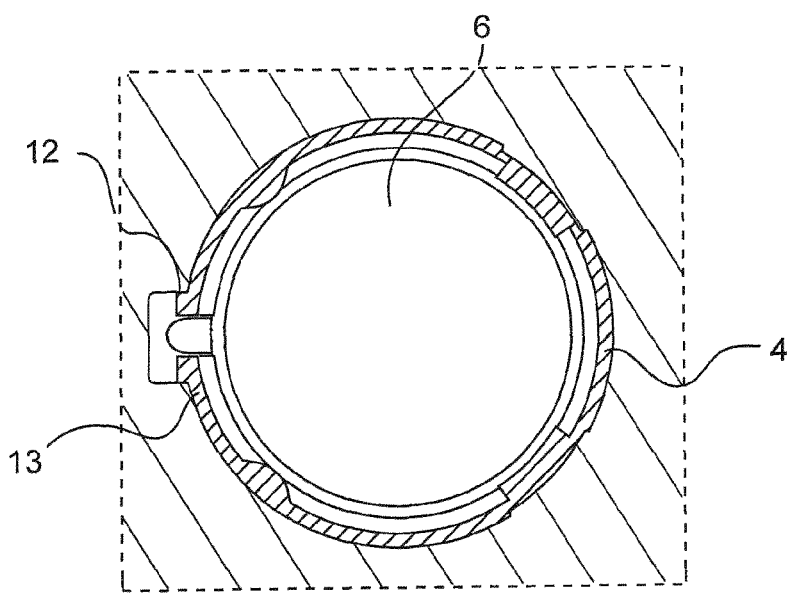
FIG. 6 shows a detail of the illustration of FIG. 4 with the installed sensor and additionally a fastening structure or apparatus in a second embodiment.

FIG. 6 shows a detail of the illustration of FIG. 4 having the installed sensor 2 and in addition the fastening structure or apparatus 4 in a second embodiment.

The fastening structure or apparatus 4 in FIG. 6 differs from the fastening structure or apparatus 4 in FIG. 5 in that the end sections 12, 13 do not end at the circumference in order to form the axial free space, but rather the end sections are bent radially outward and protrude into the groove and the axial free space is formed in between.

In this system 1, the elevation of the sensor body 6 is thus arranged between the two end sections 12, 13 protruding radially outward into the groove.

In an alternative embodiment of the fastening structure or apparatus 4, it has both end sections 12, 13 protruding radially outward into the groove and also end sections bent radially inward axially at another position. The end sections bent inward protrude into a groove which in one embodiment of the sensor 2 is provided in a longitudinal direction in the sensor housing 6.

Figure 7:
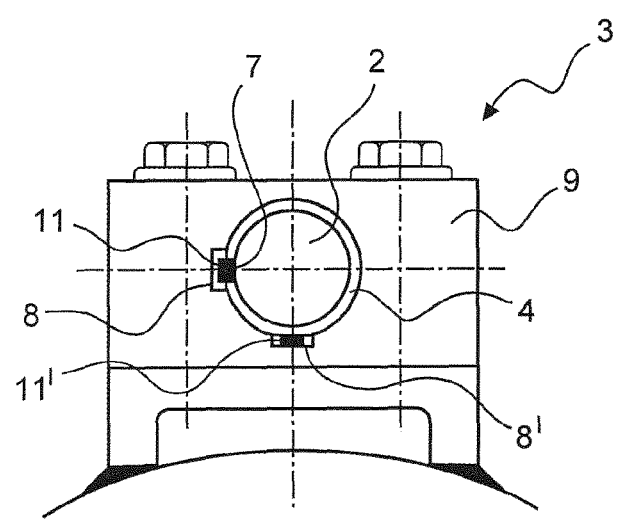
FIG. 7 shows a front view of the fastening apparatus having an alternative second and third shape feature.

FIG. 7 shows a front view of the fastening apparatus 3 having an alternative second shape feature 8, 8' and an alternative third shape feature 11, 11'.

The alternative third shape feature 11, 11' of the fastening structure or apparatus 4 has, in addition to the continuous slot (FIG. 5), an elevation as the third shape feature 11'. The elevation protrudes from the clamping sleeve, namely the fastening structure or apparatus 4, radially outward into a further groove, namely into the third shape feature 8', to implement the alignment of the clamping sleeve around the axis A in relation to the receptacle apparatus 9. The sensor 2 is aligned by the rib in the slot of the clamping sleeve, namely in the third shape feature 11, around the axis A in relation to the clamping sleeve. In an alternative embodiment, the groove is not provided in the hole for the rib of the sensor body 6, but rather the rib of the sensor body 6 merely protrudes into the slot of the clamping sleeve.

All features represented in the description, the following claims, and the drawing can be essential to the invention both individually and also in any combination with one another.

LIST OF REFERENCE SIGNS 1 system
2 sensor
3 fastening apparatus
4 fastening structure or apparatus
5 pole wheel
6 sensor body
7 first shape feature
8 second shape feature
9 receptacle body
10 receptacle apparatus
11 third shape feature
12 end at the circumference of the clamping sleeve
13 end at the circumference of the clamping sleeve
14 spring element
A axis

The invention claimed is:

1. A system, comprising:
a sensor for detecting a physical variable in dependence on an alignment of the sensor around an axis of the sensor, including:
a sensor body having a predetermined first shape feature on an outer surface of the sensor body for enabling a predetermined alignment of the sensor around the axis;
a fastening apparatus for the sensor, wherein the fastening apparatus includes a receptacle body having a receptacle apparatus to accommodate the sensor body, and a second shape feature complementary to the first shape feature on the receptacle body; and
a fastening means having a third shape feature complementary to the first shape feature and the second shape feature;
wherein the receptacle apparatus has an elongated opening having an essentially circular cross section, and wherein the fastening means has a clamping sleeve,
wherein the third shape feature is formed as an axial slot on the circumference of the clamping sleeve, wherein the slot longitudinal sides form two spaced-apart end sections, and
wherein the two end sections are bent radially outward and the groove and the clamping sleeve are configured so that the two end sections protrude into the groove, and wherein the elevation of the sensor body of the sensor, in which the first shape feature has an elevation on the outer surface of the sensor body, is arranged between the two end sections protruding radially outward into the groove.

2. The system of claim 1, wherein the physical variable is a magnetic pulse induced by a movement of an object in the vicinity of the sensor, and wherein the sensor is configured as an active speed sensor, which magnetically detects a direction of the movement of the object.

3. The system of claim 1, wherein the sensor body has an essentially circular cylindrical shape, wherein the alignment of the sensor is a predetermined orientation around a longitudinal axis of the essentially circular cylindrical shape, and wherein the elevation is arranged at a predetermined point on the circumference of the sensor housing.

4. The system of claim 3, wherein the elevation forms a rib extending in parallel to the longitudinal axis.

5. The system of claim 1, wherein the second shape feature has a groove along a longitudinal direction of the opening, wherein the clamping sleeve is for being accommodated in the opening and for being clamped therein radially between the opening and the sensor body, and wherein the clamping sleeve is provided on its circumference with the third shape feature.

6. A system, comprising:
- a sensor for detecting a physical variable in dependence on an alignment of the sensor around an axis of the sensor, including:
- a sensor body having a predetermined first shape feature on an outer surface of the sensor body for enabling a predetermined alignment of the sensor around the axis;
- a fastening apparatus for the sensor, wherein the fastening apparatus includes a receptacle body having a receptacle apparatus to accommodate the sensor body, and a second shape feature complementary to the first shape feature on the receptacle body; and
- a fastening means having a third shape feature complementary to the first shape feature and the second shape feature;

wherein the receptacle apparatus has an elongated opening having an essentially circular cross section, and wherein the fastening means has a clamping sleeve, wherein the third shape feature is formed as an axial slot on the circumference of the clamping sleeve, wherein the slot longitudinal sides form two spaced-apart end sections, and wherein the third shape feature additionally has an elevation protruding radially outward into the groove of the opening.

7. The system of claim 6, wherein the first shape feature has a depression on the outer surface of the sensor body.

8. The system of claim 6, wherein the first shape feature has an elevation on the outer surface of the sensor body.

9. The system of claim 6, wherein the second shape feature has a groove along a longitudinal direction of the opening, wherein the clamping sleeve is for being accommodated in the opening and for being clamped therein radially between the opening and the sensor body, and wherein the clamping sleeve is provided on its circumference with the third shape feature.

* * * * *